Oct. 2, 1923.　　　　　　　　　　　　　　　　　1,469,247
F. A. BOWER
BRAKE MECHANISM FOR MOTOR VEHICLES
Filed Feb. 7, 1920　　　　2 Sheets-Sheet 1

Inventor
Ferdinand A. Bower
Attorneys
Blackmore, Spencer & Kline

Oct. 2, 1923.  
F. A. BOWER  
BRAKE MECHANISM FOR MOTOR VEHICLES  
Filed Feb. 7, 1920   2 Sheets-Sheet 2
1,469,247
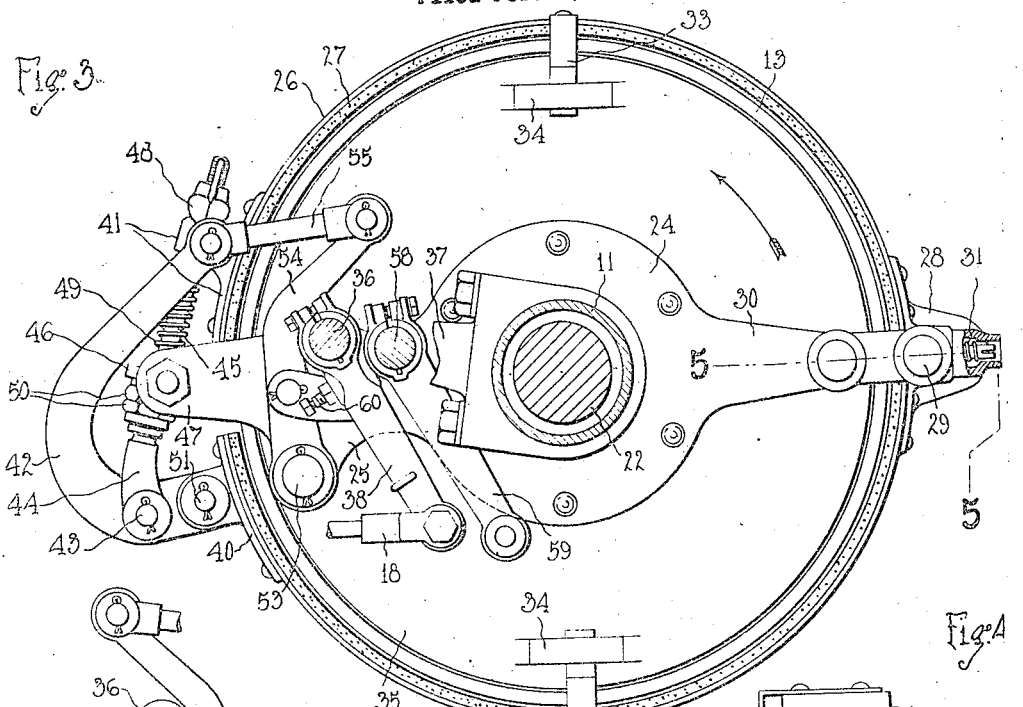
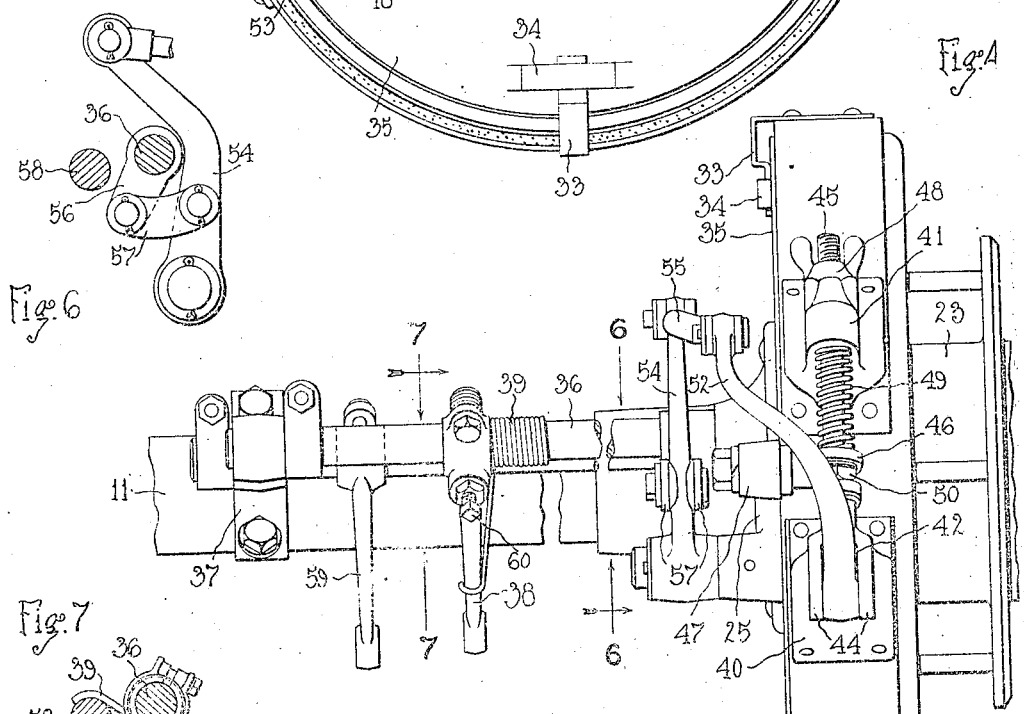
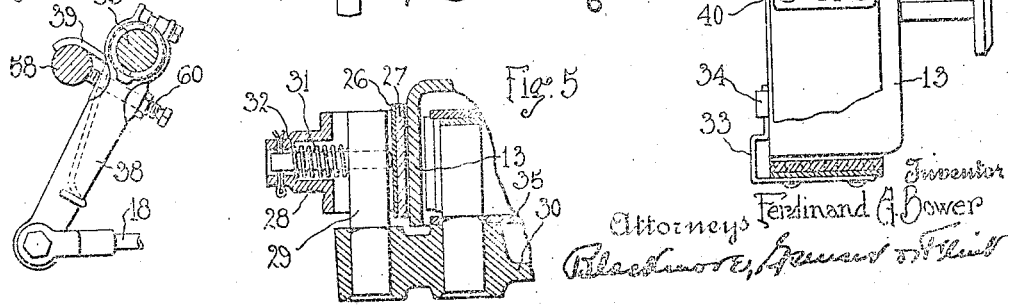
Inventor
Ferdinand A. Bower
Attorneys Patented Oct. 2, 1923.

1,469,247

UNITED STATES PATENT OFFICE.

FERDINAND A. BOWER, OF FLINT, MICHIGAN, ASSIGNOR TO GENERAL MOTORS CORPORATION, OF DETROIT, MICHIGAN, A CORPORATION OF DELAWARE.

BRAKE MECHANISM FOR MOTOR VEHICLES.

Application filed February 7, 1920. Serial No. 356,869.

*To all whom it may concern:*

Be it known that I, FERDINAND A. BOWER, a citizen of the United States, and a resident of Flint, county of Genesee. and State of Michigan, have invented certain new and useful Improvements in Brake Mechanism for Motor Vehicles, of which the following is a full, clear, concise, and exact description, such as will enable others skilled in the art to which the invention relates to make and use the same, reference being made therein to the accompanying drawings, which form a part of this specification.

My invention relates to brake mechanism for automobiles, motor driven trucks, and similar self-propelled vehicles; and particularly to brake mechanism of the type or class wherein brake drums secured one to each of the driving wheels of the vehicle are employed, and in which the braking or retarding effect is produced by forcing a brake band or equivalent member which is restrained from rotary movement into frictional engagement with the peripheral surface of each of said brake drums.

Heretofore, and particularly in the case of motor driven vehicles in which long side springs are employed at the rear end of the vehicle to thereby secure a low hung body as in the well-known Hotchkiss, cantilever and similar methods of spring suspension and arrangement, the brake operating or pull rods through which the brakes are applied have ordinarily been so disposed that the connections between their rear ends and the immediate brake applying mechanisms or levers have been above the axle housing of the vehicle, and at a point quite remote from the axle, which has resulted in the communication of vibratory motion to the brake applying pedal due to movement of the body relative to the axle of the vehicle; such vibratory or wobbling motion in the brake applying pedal when the brakes are off often being of sufficient extent, and of such a character as to cause momentary and frequent application of the brakes, and the same being due primarily to the roughness of the road along which the vehicle is traveling. In some cases it has been proposed to reduce this vibratory motion of the brake applying pedal by turning the brake mechanism up side down which resort, while it brings the points of connection between the separate pull rods through which the brakes are applied and the brake applying levers nearer the axle tube or housing of the vehicle in the case of many forms of brake mechanism and thus reduces the vibratory motion of the brake pedal due to movement of the vehicle frame relative to the axle, results in an unsatisfactory and erratic action of the brakes; because of the fact that in the case assumed and when the brakes are used wrong side up the upper portions of the brake bands are forced against fixed abutments when the brakes are applied, assuming forward movement of the vehicle, with a resulting incomplete and unsatisfactory contact between the brake bands and the brake drums and a chattering of the brakes when they are forced into engagement with the brake drums.

With the end in view of remedying the unsatisfactory matter above referred to the principal object of my invention is to provide brake mechanism wherein the pull rods through which the individual brakes are applied to the respective brake drums are disposed approximately parallel with, and in substantially the same plane as the long side springs employed at the rear end of the vehicle, and wherein the rear ends of said rods are connected with the brake applying lever mechanisms within the area of the brake drums and as near as practicable to the tube of housing of the rear axle of the vehicle and to the stirrups or equivalent members whereby the springs are supported from the axle housing; thus providing an improved brake mechanism wherein the pull rods are disposed beneath the level of the underside of the vehicle frame and beneath the various cross members thereof, and an arrangement of brake mechanism elements wherein movement of the frame relative to the axle of the vehicle will not result in the communication of vibratory or wobbling movement to the brake applying pedal; the improved brake mechanism being at the same time one in which the brakes are arranged right side up, and in which no grabbing or chattering occurs when the brakes are applied and a quiet, smooth, and satisfactory operation of the brakes is secured.

A further object of my invention is to provide brake mechanism of the class above referred to and wherein the pull rod through which each brake is applied is connected with the brake applying mechanism at a point below and as close as practicable to the rear axle housing of the vehicle, as is desirable in brake devices; while at the same time the mechanism whereby the brake band or equivalent retarding member is made to close upon and grasp the brake drum (and which commonly includes a plurality of levers, links, and like elements operatively connected with one another and necessarily so disposed as to take up considerable room) is located upon a higher level and the projecting parts thereof made to extend in an upward direction, thereby securing an arrangement of brake mechanism which is particularly advantageous in low swung motor vehicles in which the frame is located as low as is consistent with good practice in the art.

A further object of my invention is to provide brake mechanism wherein the rear end of the brake applying rod for the brake of each wheel is located below the axle housing, and the mechanism directly concerned with the forcing of the brake band into contact with the brake drum upon a higher level and for the most part above the level of the axle housing and in which the stresses due to the retarding action of the brake when the vehicle is moving forward, as is ordinarily the case, will be transmitted to the usual fixed abutment whereby rotation of the brake band is prevented through a spring, whereby a yielding and cushioning action is secured; as distinguished from through non-yielding members in contact with one another as has heretofore often been the case in brake mechanism having the low pull rod and high disposition of the brake band tightening features hereinbefore referred to and the securing of which has necessitated the using of the brake mechanism in an inverted or wrong side up position.

A further object of my invention is to provide improved brake mechanism of the type or class above referred to which will be simple in construction and easily accessible for purposes of adjustment or repair, and which will be effective for the purposes for which it is provided and employed.

With the above and other objects of invention in view, my invention consists in the improved brake mechanism illustrated in the accompanying drawing and hereinafter described and finally claimed, and in such variations and modifications thereof, within the scope of the concluding claims, as will be obvious to those skilled in the art to which my invention relates.

In the drawings accompanying and forming a part of this application and wherein the preferred embodiment of my invention is illustrated:

Figure 3 is a view showing the brake mechanism which is associated with the right-hand or far wheel, referring to Figures 1 and 2, of a motor driven vehicle in side elevation, the support for the inner ends of the brake applying shafts being broken away and the shafts appearing in section.

Figure 4 is a view showing the brake mechanism which is associated with the left-hand or near wheel in front elevation, and as seen from a position in front of the axle of the vehicle, certain portions being broken away to better show other features of my invention.

Figure 5 is a view showing a section upon a horizontal plane indicated by the line 5.5, Figure 3.

Figure 6 is a fragmentary view showing a section upon a vertical plane indicated by the line 6.6, Figure 4, looking toward the right.

Figure 7 is a fragmentary view showing a section upon a vertical plane indicated by the line 7.7, Figure 4, looking to the right.

Figure 1:
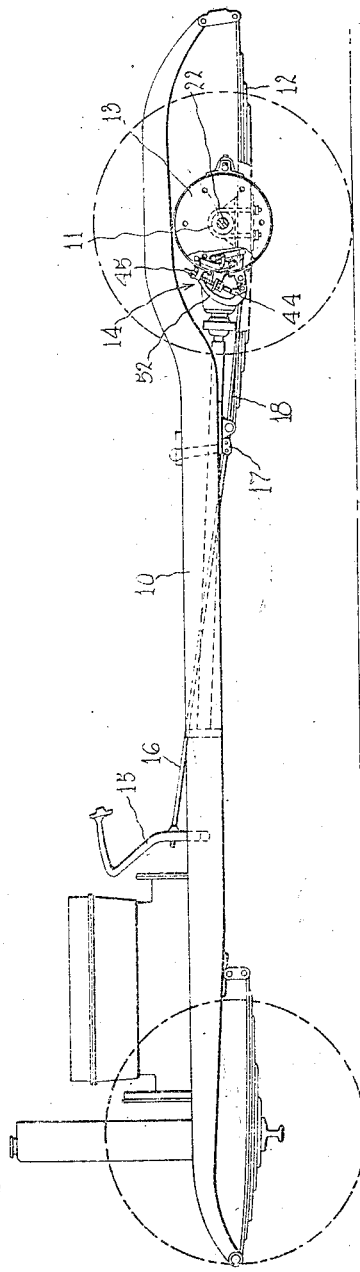
Figure 1 is a schematic view showing my improved brake mechanism as applied to a motor-driven vehicle in which a low swung frame is secured, and in which the driving is through the springs, as in the Hotchkiss type of drive.

Referring now to the drawings wherein the preferred embodiment of my invention is illustrated, the reference numeral 10 in Figure 1 designates the left-hand or near one of the two side members of the frame of a motor vehicle shown conveniently therein, and which frame members are connected with one another at suitable places by the usual cross bars not shown; the rear end of said frame being supported from the rear axle housing or axle tube 11 by means of long springs 12 located one upon each side of the vehicle and secured to said housing through suitable shackles one of which is shown in dotted lines, as it is located beyond the brake drum 13 of the near rear driving wheel indicated by the large dot and dash circle. The brake mechanisms for the two rear driving wheels are both alike in all essential respects and the one for the near wheel is designated as a whole by the reference numeral 14. The said mechanisms are operated by and through two pull rods the rear ends of which are connected one with each of said mechanisms, and with the forward ends of which rods the brake applying pedal 15 is operatively connected as through the reach rod 16 and suitable equalizing mechanism 17; the near one of said rods being designated by the reference numeral 18 in Figures 1 and 2 and the rods for applying the brake upon both driving wheels being designated by the reference numeral 18 in Figures 3 to 7, inclusive, as the brake mechanisms for the two driving wheels are alike in all essential respects.

In the form of my invention illustrated in Figure 1 the driving is through the springs 12. In the form shown in Figure 2, however, the driving is through a torque tube 19 extending between the usual universal joint and the rear axle housing or differential gearing casing; and the rear end of the frame 20 is supported from the rear axle housing through and by means of cantilever springs, the near one of which is designated by the reference numeral 21.

Figure 2:
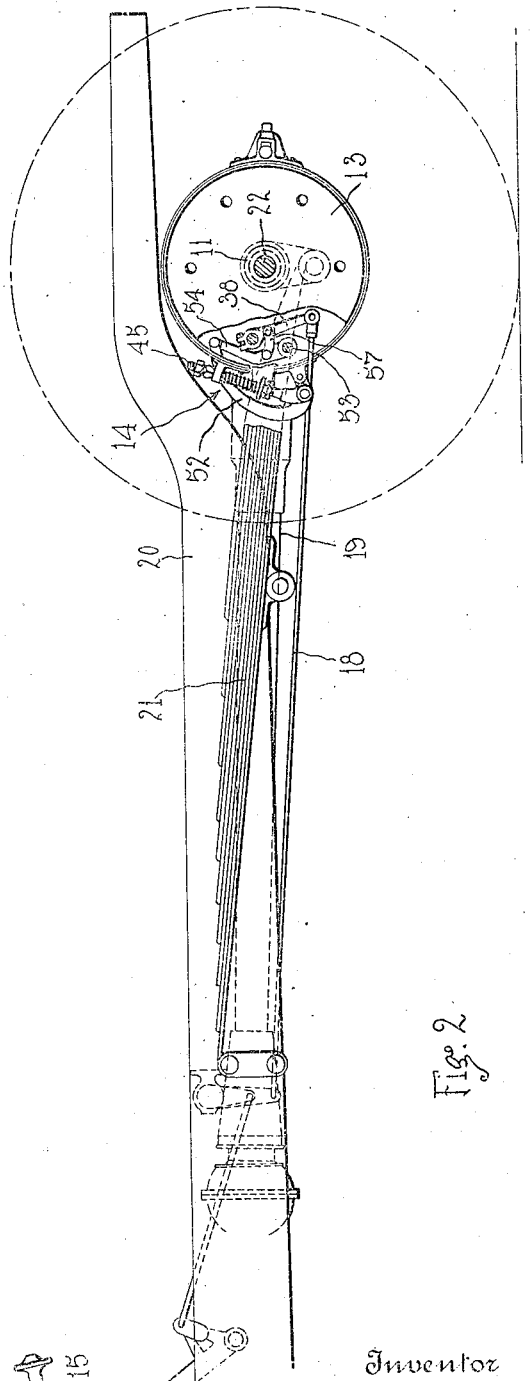
Figure 2 is a similar view showing my invention as applied to a vehicle the frame of which is supported at its rear end by means of cantilever springs, and in which the driving is through a torque tube.

It will be appreciated that in both Figures 1 and 2 a low hung frame is secured because of the type of spring support employed; the brake applying rods 18 are in both cases disposed beneath the plane of the under side of the frame, and beneath such cross bars as may be present in the frame and extending between the sides thereof; and that in both cases the movement of the rear end of the frame permitted by the springs therefor will cause little or no oscillatory movement of the brake applying pedal 15, because of the fact that the forward ends of both the springs and of the rods are fixedly connected relative to the frame and close to one another, while the rear ends of said members are connected with the axle housing and with the brake mechanisms as near together relative to a line extending transverse to the vehicle as practicable. Movement of the axle housing relative to the frame is obviously to all intents and purposes about a center substantially coincident with a transverse line at the forward ends of both the side springs and of the brake applying rods; and such movement, permitted by the springs as will be appreciated, will communicate no or substantially no vibratory movement through the rod 16 and to the brake applying pedal 15 as the frame rises and falls due to roughness of the roadway.

In the following description of my improved brake mechanism Figures 3 to 7 will be treated as though they illustrated one and the same brake mechanism; although strictly speaking Figures 3 and 5 show the brake mechanism associated with the far or right-hand driving wheel, while Figures 4, 6 and 7 show the brake mechanism associated with the near or left-hand wheel, referring to Figures 1 and 2. Both brake mechanisms are alike, however, in all essential particulars; although certain unsymmetrical elements thereof have to be made as rights and lefts, such, for example, as the brake applying levers whereby the external brake bands are made to engage their respective brake drums, as will hereinafter more fully and at length appear.

The rear driving wheels indicated by the dot and dash lines in Figures 1 and 2 are driven through axles 22 within the axle housing 11; and the brake drums 13 are secured in any way to the rear wheels, the hub of one of which is indicated at 23, in any way so as to rotate with the wheels as is usual in motor vehicles.

Supported from the rear axle housing is a spider 24 having a forwardly extending and relatively stationary arm or support 25 from which the mechanism whereby the external brake band is forced into contact with the periphery of the brake drum 13 is supported in front of the said axle housing, my improved brake mechanism being illustrated as used in connection with an external brake only, although various of the features thereof are equally applicable to internal brakes for operating the same; the brake band being designated by the reference numeral 26 and the same being commonly provided with a suitable brake lining 27 which contacts with the periphery of the brake drum. The brake band is stationary relative to the brake drum and extends about the same, and the free ends thereof lie in front of the axle housing and of the brake drum, as shown; while the rear central portion of said brake band is equipped with a bracket 28 having an internal recess or slot into which a pin 29 which is carried by a rearwardly extending arm 30 of the spider 24 extends. The reference numeral 31 designates a spring acting between said pin and an internal shoulder 32 of the bracket to thereby keep the rear half of the brake band out of contact with the brake drum when the brake is not in use; and the upper and lower sides of the brake band are steadied by arms 33 secured to the said parts and the inwardly extending ends of which are slidable in guides 34 carried by a plate 35 which is secured to the spider 24, and serves to close the open end of the brake drum within which internal brake mechanism of any suitable form is commonly located.

The reference numeral 36 designated an oscillating brake applying shaft the outer end of which is supported in a bearing provided in the support 25, and the inner end in a bearing provided in a pedestal 37 which is carried by the axle housing; and 38 designates an operating arm secured to said shaft and extending downwardly therefrom, and to the lower free end of which the rear end of a pull rod 18 is pivotally connected. The brakes upon the two rear wheels are operated from the driver's seat when the brakes are to be applied through the pull rods 18 of the brake mechanisms associated, respectively, with the two rear wheels; suitable equalizing mechanism being commonly interposed in the brake applying mechanism in order to secure a simultaneous application of the brakes and a substantially equal retarding action of the two brake mechanisms, as above explained and as is usual in motor vehicle braking devices. The arm 38 is shown as acted upon by a spring 39 which operates in conjunction with the spring 31 above referred to to hold the brake band out of engagement with the periphery of the brake drum when the brake is off.

The free ends of the brake band are provided with brackets 40, 41, and 42 designates a bent brake applying lever pivotally supported at 43 between the arms of an adjustable bifurcated supporting member 44 having an upwardly extending shank 45 which extends through a hole in an abutment 46 located above the point of pivotal support 43, and which abutment is itself supported at the free forward end 47 of the support 25 hereinbefore referred to; said shank extending through a hole in the bracket 41 at the upper of the two forward free ends of the brake band and having a threaded end provided with a wing nut 48. A spring 49 surrounds the shank 45 and acts between the abutment 46 and the under side of the bracket 41; and movement of the supporting member 44 upward, due to the action of the spring 49, is prevented by nuts 50 adjustable upon a threaded portion at the lower end of the shank 45 and which nuts engage the under side of the abutment 46.

The lowermost and shorter of the arms of the lever 42, which is itself pivotally supported from the free forward end of the support 25 by means of the bifurcated supporting member 44 as above explained, is pivotally connected at 51 with the bracket 40 which is secured to the forward end of the lowermost of the free ends of the brake band; and said lever is provided with an upwardly extending arm 52 which lies in front of the axle housing, and is offset to one side of the brake band and brake drum as best shown in Figure 4.

Also pivotally supported as at 53 from the support 25 is an upwardly extending lever 54, the upper end of which is curved backwardly and toward the axle housing, as shown; and 55 designates a link the free ends of which are pivotally connected one with the free upper end of the lever 54 and the other with the free upper end of the arm 52 of the bent lever 42, and through which link movement is communicated from the former to the latter of said levers when the brakes are applied; a movement of the said upper ends to the left, Figure 3, acting to draw the free ends of the brake band toward one another, which action is followed by contact between the band and the drum and a tightening of the band upon the drum, as will be understood.

Motion is communicated from the oscillating shaft 36 to the lever 54 when the brake is to be applied through a downwardly extending arm 56, see Figure 6, the lower end of which is operatively connected with the said lever through a pair of links 57 the ends of which are pivotally connected, respectively, with said arm and said lever.

The reference numerals 58 and 59 designate an oscillating shaft and an operating arm therefor similar to the shaft 36 and arm 38, which elements are used to operate braking elements located within the brake drum and acting against the interior of the periphery thereof, which elements, however, are not shown as their particular characteristics form no part of the invention to which this present application relates.

An adjustable cap screw 60, see Figure 7, extends through a threaded opening in the operating arm 38 and abuts against the internal brake applying shaft 58 to thereby limit the movement of said arm and, as necessarily follows, the movement of the upper end of the arm 52 to the right and the position assumed by the lower bracket 40 when the brake band is off the brake drum, while the off position of the uppermost bracket 41 may be adjustably determined by means of the wing nut 48; these adjustments being provided to secure a uniform space between the interior of the brake band and the exterior of the drum when the brake is off, and a consequent substantially simultaneous contact between said elements throughout their entire extent when the brake band is tightened and made to grasp the drum, as will be understood.

In view of the premises it will be appreciated that movement transmitted to the brake mechanism through the brake applying rod 18 by a movement of said rod to the left, or forwardly, will contract the brake band and cause it to grip the periphery of the brake drum 13; whereupon the movement of the vehicle will be retarded, and stresses will be communicated to the brake band which will tend to rotate it bodily in the direction in which the wheel is rotating which is shown by the arrow in Figure 3. Such rotary movement of the brake band, however, will be prevented by the pin 29 located at the rear portion of the brake band; while the forces acting at the free forward ends of the band, both the forces due to the pull upon the brake band transmitted through the brake applying lever 42 and the forces due to the retarding action of the brake, will be transmitted to the fixed abutment 46 through the spring 49. Brake mechanism is thus provided in which the forces transmitted to the brake band in applying the brake on the one hand, or due to the retarding action thereof upon the other, are yieldably resisted by the spring 49; thus preventing chattering of the brake which is met with in brakes wherein the retarding action results in the forcing of the operating or brake applying lever thereof against a fixed and non-yielding abutment, as is the case if and when the brake mechanism is used wrong side up to secure a disposition of the brake operating rod beneath the frame of the vehicle.

Thus further movement of the brake applying lever 42 after the brake band contacts with the brake drum compresses the spring 49, and results in an application of the brake through force transmitted through the said spring; while the force tending to rotate the band as the motion of the vehicle is retarded is transmitted to the fixed abutment 46 through the bracket 41 and the spring 49, directly, as regards the upper free forward end of the brake band; and also indirectly through the lever 42, the supporting member 44, the shank 45 thereof, the bracket 41 and the said spring 49 as regards the lower free forward end of the said band.

Having thus described and explained my invention, I claim and desire to secure by Letters Patent:

1. In brake mechanism of the class described and in combination with a rear axle housing, a rotatable brake drum, and a brake band extending about said drum and the free ends of which lie in front thereof; two brackets secured one to each of the free ends of said brake band; a relatively stationary support extending forwardly from the axle housing; an upwardly extending lever the lower end of which is pivotally connected with said support; an oscillating brake applying shaft located in front of said axle housing and one end of which is supported in a bearing provided in said support, and which shaft is operatively connected with said lever; a downwardly extending operating arm carried by said shaft; an abutment carried by the forwardly extending support aforesaid; a supporting member having a shoulder abutting against said abutment, and a threaded shank extending upwardly through a hole in said abutment and through a hole in the bracket upon the upper of the free ends of said brake band; a spring surrounding said shank and acting between said abutment and said upper bracket; a brake applying lever pivotally supported by said supporting member and which lever is pivotally connected with the bracket upon the lower of the free ends of said brake band and is provided with an upwardly extending arm; and a link extending between the upper ends of said two levers and through which motion is communicated from one of them to the other.

2. In brake mechanism of the class described and in combination with a rear axle housing, a rotatable brake drum, and a brake band extending about said drum and the free ends of which lie in front thereof and of the axle housing; a relatively stationary support extending forwardly from the axle housing; an upwardly extending lever the lower end of which is pivotally connected with said support; an oscillating brake applying shaft located in front of said axle housing and one end of which is supported in a bearing provided in said support, and which shaft is operatively connected with said lever; a downwardly extending operating arm carried by said shaft; a supporting member yieldably supported from the support aforesaid; a brake applying lever pivotally supported by said supporting member, and which lever is operatively connected with the lower of the free ends of said brake band and is provided with an upwardly extending arm; and a link extending between the upper end of said two levers and through which motion is communicated from one of them to the other.

3. In brake mechanism of the class described and in combination with a rear axle housing, a rotatable brake drum, and a brake band extending about said drum and the free ends of which lie in front thereof and of the axle housing; a relatively stationary support extending forwardly from the axle housing; an upwardly extending lever the lower end of which is pivotally connected with said support; an oscillating brake applying shaft located in front of the axle housing and one end of which is supported in a bearing provided in said support, and which shaft is operatively connected with said lever; a downwardly extending operating arm carried by said shaft; a brake applying lever pivotally supported from the support aforesaid, and which lever is operatively connected with the lower of the free ends of said brake band and is provided with an upwardly extending arm; and a link extending between the upper ends of said two levers and through which motion is communicated from one of them to the other.

4. In brake mechanism of the class described and in combination with a rear axle housing, a rotatable brake drum, and a brake band extending about said drum and the free ends of which lie in front thereof and of the axle housing; a relatively stationary support located in front of the axle housing; an upwardly extending lever the lower end of which is pivotally connected with said support; an oscillating brake applying shaft one end of which is supported in a bearing provided in said support, and which shaft is operatively connected with said lever so as to communicate motion thereto; an operating arm carried by said shaft; a brake applying lever pivotally supported from the support aforesaid, and which lever is operatively connected with the lower of the free ends of said brake band and is provided with an upwardly extending arm; and a link extending between the upper ends of said two levers and through which motion is communicated from one of them to the other.

5. In a brake mechanism of the class described and in combination with a rotatable brake drum, and a brake band extending about said drum; a relatively stationary support; an upwardly extending lever the lower end of which is pivotally connected with said support; an oscillating brake applying shaft one end of which is supported in a bearing provided in said support, and which shaft is operatively connected with said lever so as to communicate motion thereto; a downwardly extending operating arm carried by said shaft; a brake applying lever pivotally supported from the support aforesaid, and which lever is operatively connected with the lower of the free ends of said brake band and is provided with an upwardly extending arm; and a link extending between the upper ends of said two levers and through which motion is communicated from one of them to the other.

6. In brake mechanism of the class described and in combination with a rear axle housing, a rotatable brake drum, and a brake band extending about said drum and the free ends of which lie in front thereof and of the axle housing; a relatively stationary support located in front of the axle housing; an upwardly extending lever the lower end of which is pivotally connected with said support; an oscillating brake applying shaft one end of which is supported in a bearing provided in said support; an operating arm carried by said shaft; a second arm carried by said brake applying shaft; a link connecting said last mentioned arm and said lever and through which motion is communicated to said lever; a brake applying lever pivotally supported from the support aforesaid, and which lever is operatively connected with the lower of the free ends of said brake band and is provided with an upwardly extending arm; and a link extending between the upper ends of said two levers and through which motion is communicated from one of them to the other.

7. In brake mechanism of the class described and in combination with a rear axle housing, a rotatable brake drum, and a brake band extending about said drum and the free ends of which lie in front thereof and of the axle housing; a relatively stationary support extending forwardly from said axle housing; an upwardly extending lever the lower end of which is pivotally connected with said support; an oscillating brake applying shaft located in front of the axle housing and one end of which is supported in a bearing provided in said support; a downwardly extending operating arm carried by said shaft; a second arm carried by said brake applying shaft; a link connecting said last mentioned arm and said lever and through which motion is communicated to said lever; a brake applying lever pivotally supported from the support aforesaid, and which lever is operatively connected with the lower of the free ends of said brake band and is provided with an upwardly extending arm; and a link extending between the upper ends of said two levers and through which motion is communicated from one of them to the other.

8. In brake mechanism of the class described and in combination with a rear axle housing, a rotatable brake drum, and a brake band extending about said drum; a relatively stationary support extending from said axle housing; an upwardly extending lever the lower end of which is pivotally connected with said support; an oscillating brake applying shaft one end of which is supported in a bearing provided in said support; a downwardly extending operating arm carried by said shaft; a second arm carried by said brake applying shaft; a link connecting said last mentioned arm and said lever and through which motion is communicated to said lever; a brake applying lever pivotally supported from the support aforesaid, and which lever is operatively connected with the lower of the free ends of said brake band and is provided with an upwardly extending arm; and a link extending between the upper ends of said two levers and through which motion is communicated from one of them to the other.

9. In brake mechanism of the class described and in combination with a rear axle housing and a rotatable brake drum; a stationary support carried by said housing and extending to one side thereof; two oscillating brake applying shafts associated one with a brake member cooperating with the outer and the other with a brake member cooperating with the inner surfaces of said brake drum, and the outer ends of which shafts are supported in bearings provided in said support; means carried by the axle housing for supporting the inner ends of said shafts; an arm carried by one of said shafts; and a screw extending through a threaded passageway provided in said arm, and the free end of which engages the other of said shafts.

10. In brake mechanism of the class described and in combination with a rear axle housing and a rotatable brake drum; a stationary support disposed to one side of said axle housing; two oscillating brake applying shafts associated one with a brake member cooperating with the outer and the other with a brake member cooperating with the inner surfaces of said brake drum, and the outer ends of which shafts are supported in bearings provided in said support; means for supporting the inner ends of said shafts; an arm carried by one of said shafts; and a screw extending through a threaded passageway provided in said arm, and the free end of which engages the other of said shafts.

11. In brake mechanism of the class described and in combination with a motor vehicle having a rear driving axle, and a frame supported from said axle through side springs extending longitudinally of the vehicle; a rotatable brake drum concentric with said rear axle; a non-rotatable brake member; means associated with said brake member for forcing the same into engagement with said brake drum; and a brake rod the rear end of which is operatively connected with said brake forcing means and the forward end of which is connected with a brake applying member at a point in substantial transverse alignment with the points of connection between the forward ends of said side springs and said frame.

12. In brake mechanism of the class described and in combination with a motor vehicle having a rear driving axle, and a frame supported from said axle through side springs extending longitudinally of the vehicle; a rotatable brake drum concentric with said rear axle; a non-rotatable brake member; means associated with said brake member for forcing the same into engagement with said brake drum; a brake rod the rear end of which is operatively connected with said brake forcing means and the forward end of which is connected with a brake applying member at a point in substantial transverse alignment with the points of connection between the forward ends of said side springs and said frame, and which rod extends substantially parallel with said side springs; and a brake operating lever operatively connected with said rod.

In testimony whereof I affix my signature.

FERDINAND A. BOWER.